O. R. HOLBROOK.
Cloth-Measuring Devices.
No. 142,787. Patented September 16, 1873.
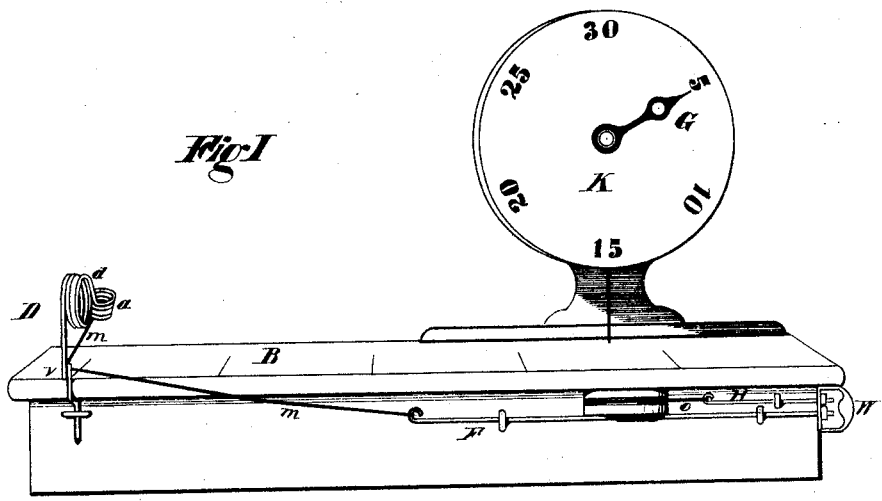
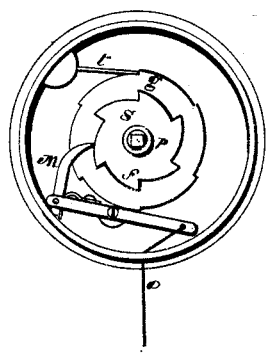
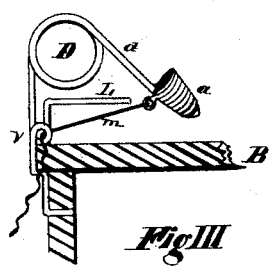
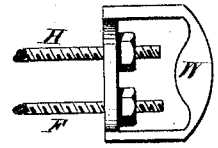
Witnesses
Wm B. Parker
E. Dudley Chapin
Inventor
Otis R. Holbrook
by his attorneys
Gardiner & Hyde

UNITED STATES PATENT OFFICE.

OTIS R. HOLBROOK, OF STAFFORDVILLE, CONNECTICUT.

IMPROVEMENT IN CLOTH-MEASURING DEVICES.

Specification forming part of Letters Patent No. 142,787, dated September 16, 1873; application filed March 13, 1873.

*To all whom it may concern:*

Be it known that I, OTIS R. HOLBROOK, of Staffordville, Tolland county, State of Connecticut, have invented an Improved Device for Measuring Cloth, of which the following is a specification:

My invention relates to the construction and combination, with the counter upon which cloth is measured, of a device for marking at one end of the scale of measurement laid off upon the counter upon the cloth at that point, and of a dial, the hand of which is operated by mechanism behind it, to cause it to indicate each successive length of cloth brought over the scale upon the counter simultaneously with the mark being made, showing the length of the scale upon the cloth, so that when the cloth being measured is brought over the counter until the mark made upon it at one end of the scale is brought to the other end, and a handle convenient to the operator pulled, another mark is made upon the surface of the cloth, and another measurement recorded upon the dial-face; the object of my invention being to enable one operator to easily and accurately perform the work of measuring cloth hitherto requiring two, one at each end of the scale, usually five yards, to adjust and mark the cloth and keep an account of the length measured.

In the drawing, Figure I is a perspective view. Fig. II shows the mechanism for operating the hand, Figs. III and IV being detail views.

Attached to the counter B, at the end of the scale from which the cloth is fed, is the spring-marker, D, which I form of spring-wire, and to exert a spring pressure upon the arm $d$, having upon its end the chalk-holder $a$, to return it to its position above the cloth when released by the pressure drawing it over the cloth surface, and it will be seen that when the chalk in the holder $a$ is pulled by the cord $m$ it is drawn over the surface of the cloth in a manner admirably adapted for marking the same.

The cord $m$ from the holder $a$ is carried through the pulley $v$ and over the side of the counter, to be attached to its operating-rod F. The rod F passes through staples upon the side of the counter to the handle W. Received also through the handle W is the end of rod H, the other end of which has secured to it cord $o$, which operates the pointer.

The rods F and H, operating respectively the marker D and pointer G upon dial K, being attached at their ends to the handle W, it is evident that any motion of the handle will effect simultaneously the marker and dial-pointer, and when the handle is pulled by the operator sufficiently far to draw down against the cloth the marker D, it at the same time moves the pointer one division on the dial, which divisions correspond to the length of the scale on the counter; and by means of the mechanism shown in Fig. II, where $g\ f$ are ratchets upon the same hub $s$ carrying the shaft $p$ holding the pointer G.

The ratchet $g$ is engaged by spring $e$ to allow its movement in only one direction, and the hinged spring-pawl M operates to revolve the pointer when operated itself by cord $o$ communicating over suitable pulleys or rollers with rod H.

In order that the action of the pointer and marker may be at any time relatively adjusted, I provide the ends of rods F H, where received within the handle W, with screw-threads, so that by means of nuts within the handle they may be lengthened or shortened, as shown in Fig. IV.

The dial K, with its pointer G and mechanism, may be directly attached to the counter, or may be away from it at any point convenient to the view, and the cords $o$ and $m$ with the rods F and H may be within the counter without changing the principle of my invention.

In practice I place the guard L as shown in Fig. III to prevent the cloth from flying up against the marker while being pulled over or slid upon the counter.

Now, having described my invention, what I claim is—

In combination with a measuring-counter, B, the spring-marker D and registering-dial K, when arranged and constructed to act conjointly, substantially in the manner as shown and described.

OTIS R. HOLBROOK.

Witnesses:
 ARTHUR D. THOMAS,
 A. S. EATON.